United States Patent [19]
Koelzer et al.

[11] Patent Number: 5,425,572
[45] Date of Patent: Jun. 20, 1995

[54] QUICK-RELEASE VALVE FOR A VEHICLE AIR RELEASE BRAKE SYSTEM

[75] Inventors: Robert L. Koelzer, Kearney; Steven D. Wallestad, Kansas City, both of Mo.

[73] Assignee: Midland Brake, Inc., Kansas City, Mo.

[21] Appl. No.: 78,139

[22] Filed: Jun. 15, 1993

[51] Int. Cl.[6] ............................................. B60T 15/32
[52] U.S. Cl. .................................. 303/69; 137/102
[58] Field of Search ............... 303/69, 71, 37–39, 303/80–82; 137/102, 107, 843

[56] References Cited

U.S. PATENT DOCUMENTS

| | | | |
|---|---|---|---|
| 259,682 | 6/1882 | Gruber | 137/107 X |
| 1,965,070 | 7/1934 | Cumming | 137/102 |
| 3,340,899 | 9/1967 | Welty et al. | 137/843 X |
| 4,453,780 | 6/1984 | Neal | 303/69 |
| 4,596,265 | 6/1986 | Goodell | 303/69 X |
| 5,078,455 | 1/1992 | Washingotn | 303/69 |

FOREIGN PATENT DOCUMENTS 1187441 2/1965 Germany .................. 137/102

*Primary Examiner*—Mark T. Le
*Assistant Examiner*—Peter M. Poon
*Attorney, Agent, or Firm*—Leydig, Voit & Mayer, Ltd.

[57] ABSTRACT

A simplified and less-costly quick-release valve with controlled hysteresis for a vehicle spring-set air-release parking brake system lengthens the operating life of the valve, reduces energy consumption, extends compressor life and alleviates noise problems. The valve comprises a valve body and a plurality of internal passageways each of which is selectively connectable to at least another of the passageways. The selective connection is controlled by an integrally-formed flexural spring-brake-control release diaphragm within the valve body and disposed to either isolate or selectively connect the passageways depending on the relative pressure conditions within the passageways and respective areas of the diaphragm exposed to the pressures. The components are designed so that the normal variations or cycling of the supply or intake pressurized air does not cause cycling of the pressure in the spring-brake chambers.

12 Claims, 4 Drawing Sheets

QUICK-RELEASE VALVE FOR A VEHICLE AIR RELEASE BRAKE SYSTEM

FIELD OF THE INVENTION

This invention relates to quick-release valves and more particularly to a quick-release valve for use with spring-set air-release parking brakes forming a part of vehicle air brake system.

BACKGROUND OF THE INVENTION

Spring-set air-release parking brakes are commonly utilized in trailers and heavy-duty over-the-road highway trucks and the like. These brakes utilize large heavy-duty coil springs to preset the brakes in a normally-locked condition and are released by air pressure.

Quick-release valves are commonly employed in these spring-set air-release parking brake systems. A typical prior art quick-release valve 10 is shown in a non-pressurized state in FIG. 1 and is discussed at this point as background for the present invention.

The valve 10 permits air under pressure to enter the valve 10 at an inlet 12. The pressurized air at the inlet 12 deforms or flexes the periphery of a diaphragm 14 downwardly (as viewed in FIG. 1), sealing exhaust port 19 and permitting air to flow from the inlet 12 to outlets 16 which are in fluid communication with parking brake chambers 18, also referred to as spring-brake chambers 18. When the pressure in the chambers 18 is larger than the pressure at the inlet 12, the diaphragm 14 is flexed or deformed upwardly, sealing inlet 12 and allowing air within the chambers 18 to escape through the outlets 16, under the deformed central portion of the diaphragm 14, and out the exhaust port 19. The exhaustion of air from chambers 18 continues until the respective pressures on each side of diaphragm 18 are substantially equalized, assuming that the effective areas on each side are substantially equal.

Although the prior quick-release valves perform their primary function, i.e., assisting in the quick release of the air from the chambers of the parking brakes to effectuate quick setting of the parking brakes, such valves operate in an inefficient manner. For example, the compressors in the prior systems, rather than being in continual operation, have duty cycles in which they are deactivated when the system air pressure exceeds a first predetermined level, e.g., about 120 psi, and are reactivated when the system air pressure falls below a second predetermined level, e.g., about 90 psi. (The pressures referred to herein are gauge pressures.)

The system air pressure thus typically varies through a cycle from about 120 psi to about 90 psi. As the system air pressure rises from about 90 psi, and as above indicated, the periphery of the diaphragm 14 is deflected downwardly, permitting air to flow from the compressor to the parking brake chambers 18. As pressure in the system inlet falls from about 120 psi to about 90 psi, the central portion of the diaphragm moves upwardly exposing the exhaust port and permitting the air in the brake chambers to escape through the exhaust port 19.

Thus, such prior quick-release valves are beset with one or more of the following shortcomings:

a) The continual flexing of the diaphragm into various modes as the system air pressure cycles between about 90 and about 120 psi causes fatigue of the diaphragm in the quick release valve as well as other affected components in the brake system, such as the diaphragm and center seal of the spring brake chamber, leading to premature failures;

b) Energy is needlessly consumed, and thus wasted, from operating the compressor to recharge the spring-brake chambers from about 90 psi to about 120 psi as the system pressure rises during the actuation of the compressor;

c) The compressor has excessive wear and reduced life due to the added air demands to systematically fill and refill the spring-set brake chambers during each compressor activation/deactivation cycle; and d) Objectionable noise occurs as the air is exhausted from the spring-set brake chambers when the inlet pressure drops from about 120 psi to about 90 psi or lower.

These and related problems have been recognized and solutions thereto proffered. Some background, for example, is set forth in U.S. Pat. No. 4,191,428, issued Mar. 4, 1980. Some solutions have been implemented, but the solutions have added complexity and costs, including additional components, increased assembly time, higher maintenance costs, and increased inventory burdens, both for manufacture and repair.

OBJECTS OF THE INVENTION

It is therefore a general object of the present invention to cope with the shortcomings and problems of the prior art with less complexity and lower cost.

It is a specific object of the present invention to provide an improved quick-release valve which controls the spring-set parking brake chamber pressure at a predetermined delivery pressure while the intake pressure varies through the normal range of the compressor cycle.

It is another specific object to lengthen the operating life of the quick-release valve, as well as other affected components of the brake system, while at the same time reducing energy losses caused by unnecessary compressor use.

It is still another specific object to provide a quick-release valve which reduces vehicle noise and is in compliance with federal drive-by noise standards.

It is a further specific object to cope with shortcomings of other solutions to the problems addressed herein employing a relatively-simple, integrally-formed key component, which takes the place of multi-component counterparts with attendant advantages.

Further and additional objects and advantages inherent in the improved quick-release valve will become apparent from the following description, accompanying drawings, and appended claims.

SUMMARY OF THE INVENTION

In accordance with one embodiment of the invention, an improved quick-release valve is provided for permitting air transfer from an intake source to a delivery destination when intake pressure is greater than delivery pressure. The improved quick-release valve releases delivery air into the atmosphere only when intake pressure is significantly lower than delivery pressure. This attribute is achieved by imparting controlled hysteresis to the valve operation as herein set forth.

The improved quick-release valve comprises a valve body; a plurality of internal passageways within the valve body, including an internal passageway for fluid communication with an intake source such as an external pressurized fluid supply, an internal passageway for fluid communication with an external spring-brake chamber and an internal passageway for fluid communication with exhaust. Each of these three internal passageways are selectively connectible to at least another of the three so as to establish continuous internal fluid communication therewith.

The selective connection is achieved by an integrally-formed flexural spring-brake-release control diaphragm within the valve body and disposed in relation to the three internal passageways to either isolate them from each other, or, responsive to pressure conditions therein, to connect them selectively. The internal passageway for fluid communication with a pressurized-fluid supply is connected to the internal passageway for fluid communication with an external spring-brake chamber only when the fluid pressure in the former exceeds that in the latter. The internal passageway for fluid communication with an external spring-brake chamber is connected to the internal passageway for fluid communication with exhaust only when the pressure in the internal passageway for fluid communication with an external spring-brake chamber exceeds that in the internal passageway for fluid communication with a pressurized fluid supply by a predetermined pressure ratio.

As will become apparent, the desired selectivity in internal passageway connections is achieved in part by exposing surfaces of predetermined different areas on the opposite sides of the diaphragm to the respective pressures in the contiguous internal passageways. The ratio of these areas is reflected in the ratio of pressures which initiates certain diaphragm flexure or movement.

In a specific embodiment to be discussed in connection with the drawings, the improved quick-release valve includes a body having first and second ends, a collar depending from the first end, and a first annular rib extending from the first end inside the collar. In addition, the valve includes a first conduit extending from an area of the first end delimited by the first rib to a second end, the latter communicating with the compressed air supply. A second conduit is provided which is spaced laterally from the first end of the first conduit and is formed in and extends through the collar.

A cap is also provided which has a central portion having a first face, and an opposing second face. The cap central portion is encompassed by a peripheral flange having inner and outer segments. The cap is fixedly located within the collar and forms a pocket between the cap first face and the first end of the body. The outer segment of the peripheral flange sealingly engages an interior surface of the collar. The cap first face is provided with a second annular rib which is substantially concentrically disposed within the first annular rib. At least one through port is formed within the cap central portion and interconnects the first and second faces. The port is within the area delimited by the second rib and is in communication with the atmosphere at the second surface.

An integrally-formed flexural spring-brake-release control diaphragm which is pressure-responsive is located within the pocket and extends beyond the first rib and sealingly engages both the first and second ribs when the diaphragm is in a normal relaxed condition. The diaphragm has a first portion which spans the distance between the first and second ribs, and a second portion encompassed by the second rib. In order to permit air flow from the first conduit to the second conduit the compressed air supply pressure (intake pressure) must be greater than the pressure at the second conduit (delivery or destination pressure). Where, however, the intake pressure is significantly lower than the delivery pressure, the diaphragm first portion, which has a significantly larger area than that of the second portion, is deflected so as to unseat the diaphragm from the second rib thereby causing the second conduit and the port to be in communication with one another.

By utilizing the different areas on the opposite sides of the diaphragm, a bias or hysteresis may be designed into the quick-release valve whereby air may fill the brake chambers as long as the delivery pressure is less than the inlet pressure (e.g., about 120 psi, gauge). While the compressor is operating, the spring-brake chamber pressure rises until it reaches about 120 psi whereupon operation of the compressor is discontinued. When the compressor is resting, that is, while the supply pressure is decreasing from about 120 psi to about 90 psi, the compressed air is not being exhausted from the spring-brake chambers.

The pressure in the inlet line must fall below a predetermined pressure, e.g., a predetermined pressure selected from the range of about 35-80 psi to effect exhaust of the chambers, e.g., about 60 psi. Therefore, as the inlet pressure varies from about 120 psi to about 90 psi and from about 90 psi to about 120 psi no exhaustion of the air from the brake chambers occurs. As will be apparent, exhaustion of the chambers, once started, continues only so long as the pressure differential between the inlet line on the low side and chambers on the high side exceeds whatever the predetermined ratio may be, as determined by the effective area differences on opposite sides of the diaphragm.

During the cycling of the compressor between about 120 psi and about 90 psi there is no deflection of the diaphragm of the quick release valve or affected components of the spring brake chamber and thus premature fatigue of the diaphragm and affected components is avoided. In addition, compressor use and wear are lessened with concomitant noise reduction.

In another and presently-preferred embodiment a different type of integrally-formed flexural spring-brake-control diaphragm is employed which obviates the need for the aforementioned first and second ribs. The preferred diaphragm is readily molded and enhances quality control as compared with manufacturing a valve requiring a plurality of precision ribs.

While the preferred design appears somewhat different structurally, the principle of operation and function, including the aforementioned hysteresis or bias, are still the same as with the ribbed design. This will be readily apparent from the detailed description of both hereinafter set forth.

While the descriptions herein contemplate compressed air as the operating medium, particularly as applied to heavy-duty over-the-road trucks and tractor-trailer combinations, those skilled in the art will recognize that the invention lends itself to any suitable fluid medium, liquid or gaseous. It is intended that the invention be so construed even though the specific embodiments are described hereinafter with the conventional compressed air medium.

As those skilled in the art are also aware, the quick-release valve of the present invention would typically be integrated with and interact with other valve and valve functions, all within a master valve body. As a result, the specific design details will depend in part upon other master valve components. To facilitate a full disclosure of the particular invention to which the claims are directed, the drawings are limited thereto, and external connecting components are suggested diagrammatically, if at all. In addition, components well known to those skilled in the art are omitted in the interest of clarity of disclosure, e.g., flexible seals over the exhaust to inhibit the entry of dirt, fastening means, and the like.

DESCRIPTION OF THE DRAWINGS

As already set forth in the background discussion.

It should be recognized that in depicting and describing the spring-brake-release control diaphragms of both embodiments, the actual and instantaneous shape or appearance depends in part upon their respective flexural characteristics, the pressure differentials to which they are subjected, the rate of change of such differentials, the respective areas subjected to the pressure differentials and the like. The drawings are merely illustrative of the function of the diaphragm at various stages.

While the invention will be described in connection with both embodiments, there is no intent to limit the coverage to such embodiments. On the contrary, the intent is to cover all alternatives, modifications, and equivalents included within the spirit and scope of the invention commensurate with the advance over the prior art.

DESCRIPTION OF THE EMBODIMENTS

Figure 1:
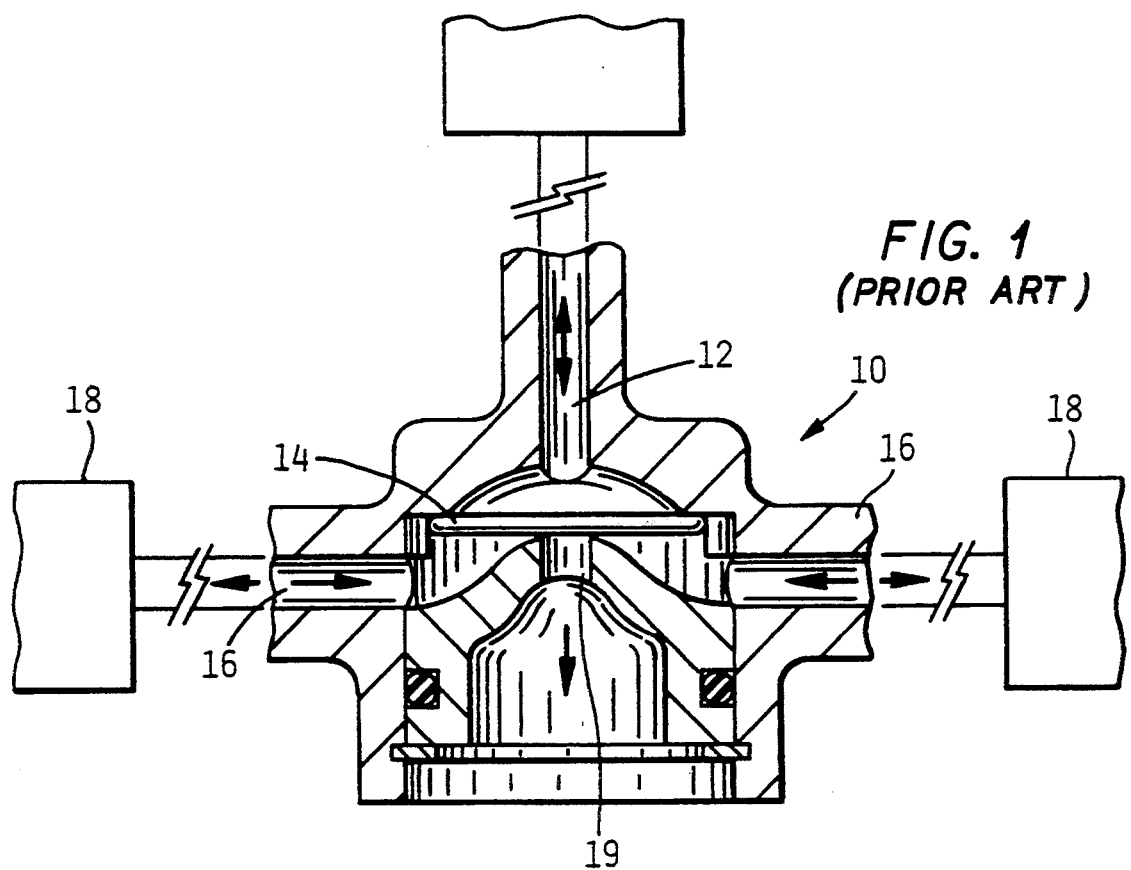
FIG. 1 is a fragmentary vertical cross-sectional view of a typical prior art valve with the diaphragm thereof in a relaxed, no-flow, mode.
Figure 2:
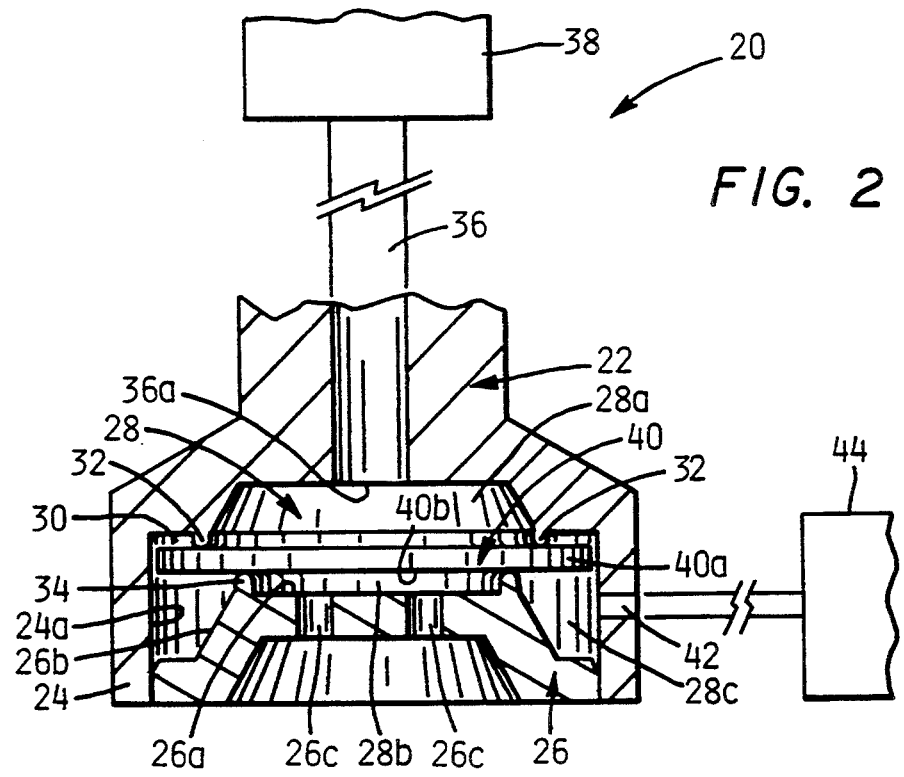
FIG. 2 is similar to FIG. 1 but showing one embodiment of the improved quick-release valve of the present invention with the diaphragm thereof in a relaxed, no-flow, mode.

Now again referring to the drawings, there is shown in FIG. 2 an embodiment of the improved quick-release valve 20 which comprises a body 22 with a depending collar 24 and a cap 26 fixedly disposed within the collar. The cap cooperates with the collar 24 to form an internal cavity or pocket 28. A cavity-forming surface 30 of the body is provided with an annular first valve seat in the form of a downwardly projecting rib 32. The rib 32 is spaced outwardly from an annular second valve seat which is in the form of a rib 34 projecting upwardly from a centrally located cavity-forming surface 26a of the cap 26.

The ribs 32 and 34 are disposed in opposed concentric relationship. Valve seat rib 32 encompasses one end of a conduit or passageway 36 formed in the upper portion of body 22. The conduit 36 is in communication with an air supply 38, typically compressed air which may cycle in pressure from about 120 psi to about 90 psi under normal conditions as above indicated. In practice, the fluctuation may be even greater.

A pressure-responsive circular diaphragm 40 of suitable air-impervious, resilient material such as rubber (e.g., about 70 durometer) is disposed within cavity 28. As will be apparent, diaphragm 40 functions as a spring-brake-control quick-release diaphragm. The size, resiliency and material of diaphragm 40 will depend upon the type, size and rating of the particular air brake system in which it is employed, as those skilled in the art will readily recognize in the light of the present disclosure. In a typical embodiment, diaphragm 40 may have a diameter of about 1 ¾ inches and a thickness of about 1/16 inch. Other dimensions of valve components will bear the general relationships to diaphragm 40, as depicted in FIG. 2.

When the diaphragm 40 is in the relaxed state (FIG. 2), such as when there is no air supply in passageway 36 and chamber 44 has not as yet been charged, the peripheral portion 40a thereof is in engagement with both ribs 32 and 34. Diaphragm 40 remains in a relaxed state as long as the pressure differential between the first and second conduits 36 and 42 does not exceed about two psi. The peripheral portion 40a of the diaphragm 40 encompasses the central surface 26a of the cap and is in superposed relation with an area of cap surface 26b which is disposed between the second valve seat rib 32 and the interior surface 24a of collar 24.

Diaphragm 40 has a peripheral portion 40a thereof sandwiched between the first and second ribs 32 and 34. When deflected in a first direction (FIG. 3), diaphragm 40 permits air flow from conduit 36 to a laterally-disposed second conduit 42 formed in collar 24 and spaced outwardly from both ribs 32 and 34. Conduit 42 is in continuous communication with the vehicle brake chambers 44 (only one being shown for simplicity). Thus, when the diaphragm is deflected away from the valve seat rib 32 (FIG. 3), the chamber 44 is charged with compressed air until the pressure within the chambers reaches approximately 120 psi.

Diaphragm 40 separates cavity 28 into a first section 28a disposed between the diaphragm and the end 36a of the first conduit 36; a second section 28b disposed between the diaphragm central portion 40b and the cap central surface 26a; and a third section 28c defined by the second valve seat rib 34, the collar interior surface 24a, the underside of diaphragm peripheral portion 40a and the upper surface of an offset marginal flange 26b formed at the outer edge of cap 26, as shown in FIG. 2.

Figure 4:
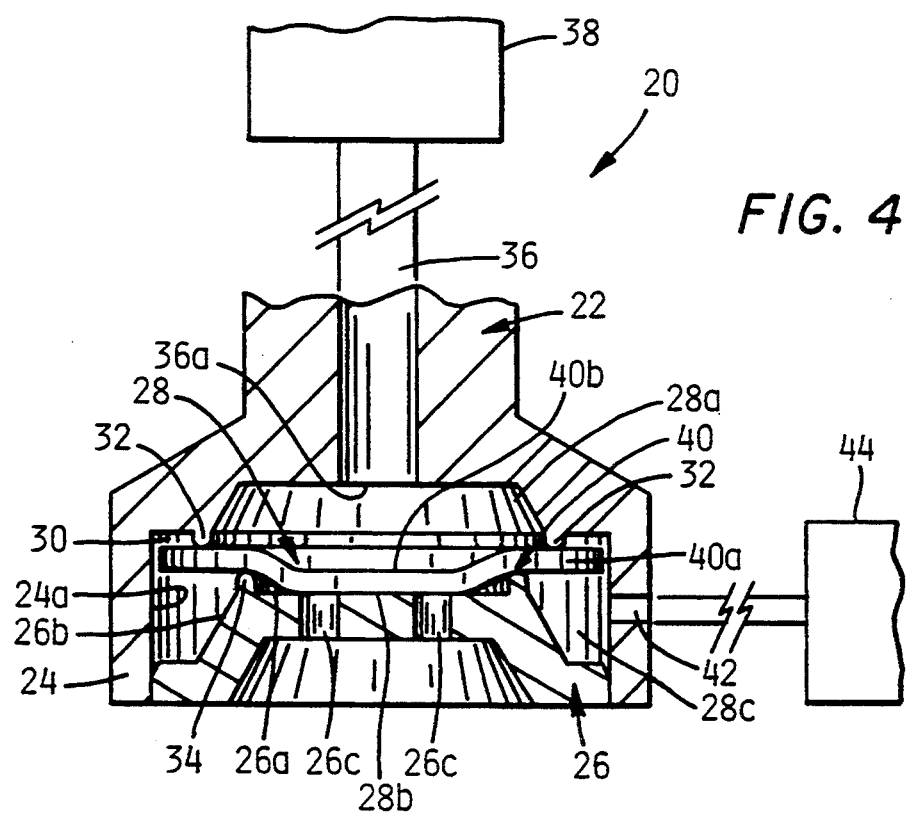
FIG. 4 is similar to FIGS. 2 and 3 but showing the valve diaphragm as it appears during normal operation with the brake chambers already charged and the center portion of the diaphragm flexed towards the exhaust passages.

The cap central surface 26a is provided with one or more exhaust ports 26c which are vented to the atmosphere. Thus, during normal operations after the brake chamber 44 is charged, typically to about 120 psi, the outer portions of diaphragm 40 are not deflected, but the diaphragm central portion 28b is flexed downwardly, because of the pressure differential between cavity 28a and exhaust ports 26c, as shown in FIG. 4.

Figure 5:
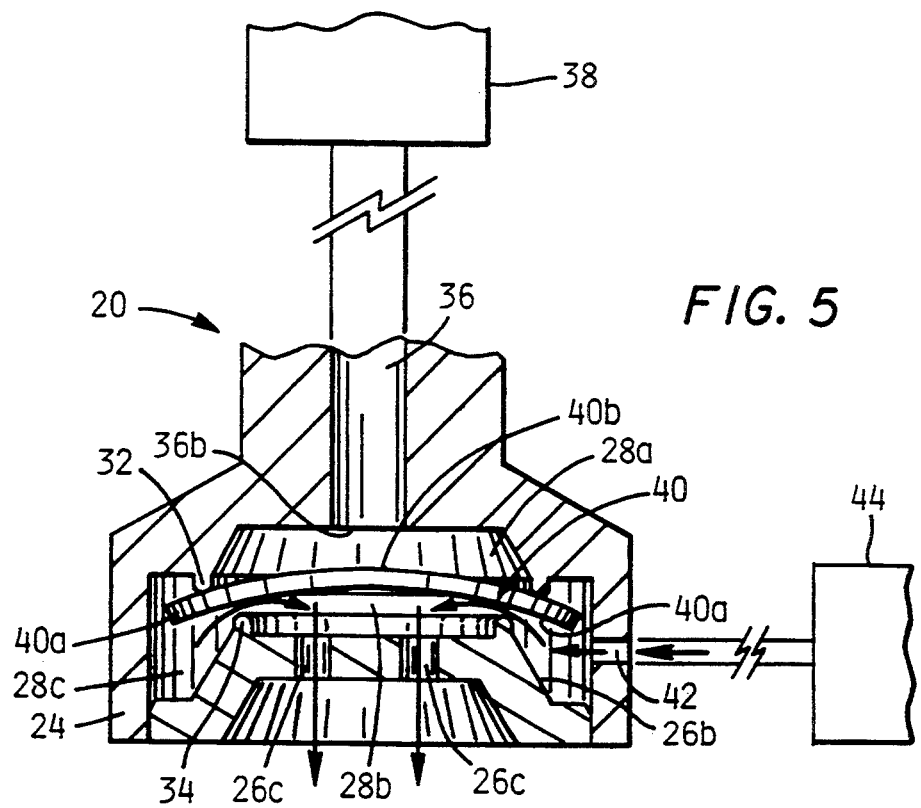
FIG. 5 is similar to FIGS. 2, 3 and 4 but showing the valve diaphragm in an exhaust mode whereby the brake chambers are discharged to exhaust.

When the pressure in conduit 36 drops below a predetermined level requiring application of the spring brakes, e.g., below about 30–65 psi, the peripheral and central portions of diaphragm 40 are deflected in a second direction as shown in FIG. 5. The peripheral portion 40a remains in sealing engagement with the first valve seat rib 32 and simultaneously assumes an unsealing relation with the second valve seat rib 34. Thus, the compressed air within the brake chamber 44 is exhausted to the atmosphere through ports 26c.

Figure 3:
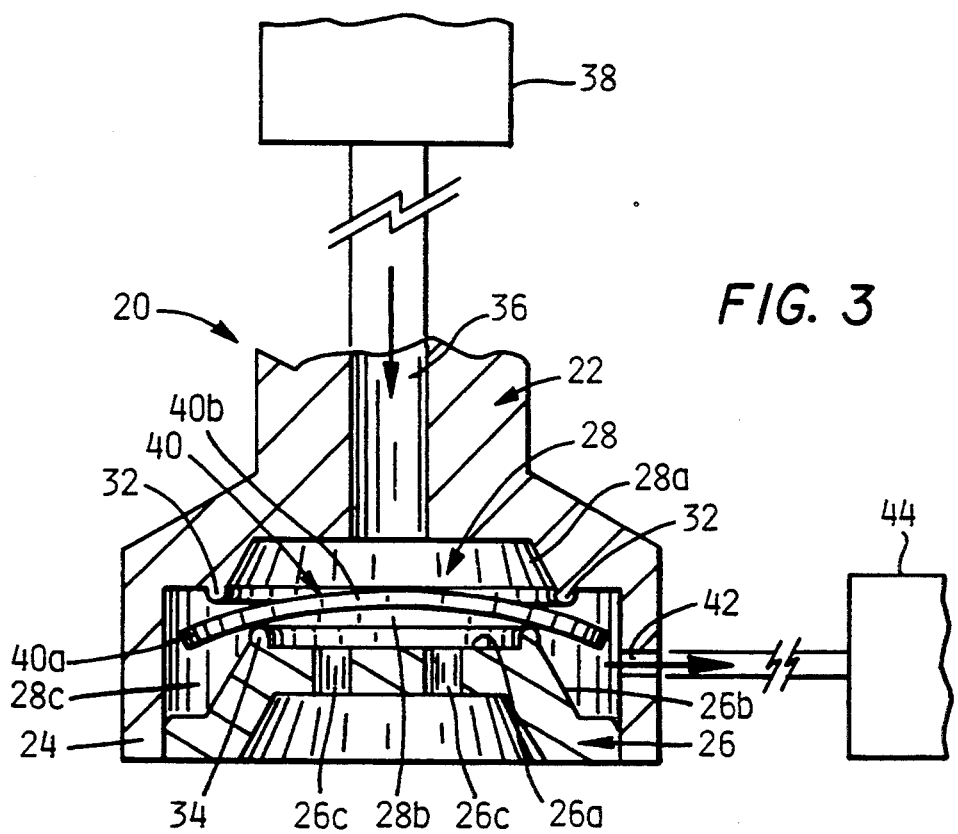
FIG. 3 is similar to FIG. 2 but showing the valve diaphragm in an air-delivery mode whereby the brake chambers are charged.

As already set forth, diaphragm 40 assumes a first deflected position, as shown in FIG. 3, when the compressor is operating and providing approximately 120 psi pressure and the brake chambers are being charged to approximately 120 psi. The diaphragm assumes a second position, as shown in FIG. 4 during normal operations with the spring brakes held released at about 120 psi and pressures in passageway 36 cycling above the spring-brake release pressure. Diaphragm 40 assumes a third deflected position as shown in FIG. 5, when the pressure in passageway 36 falls below the spring-brake release pressure.

Thus, during a normal operating mode of the vehicle incorporating valve 20, cycling of the compressor to maintain adequate spring brake chamber pressure is not required, and energy required to cycle the compressor is avoided, and exhausting of the air from the brake chambers and the noise pollution resulting therefrom are eliminated.

Figure 6:
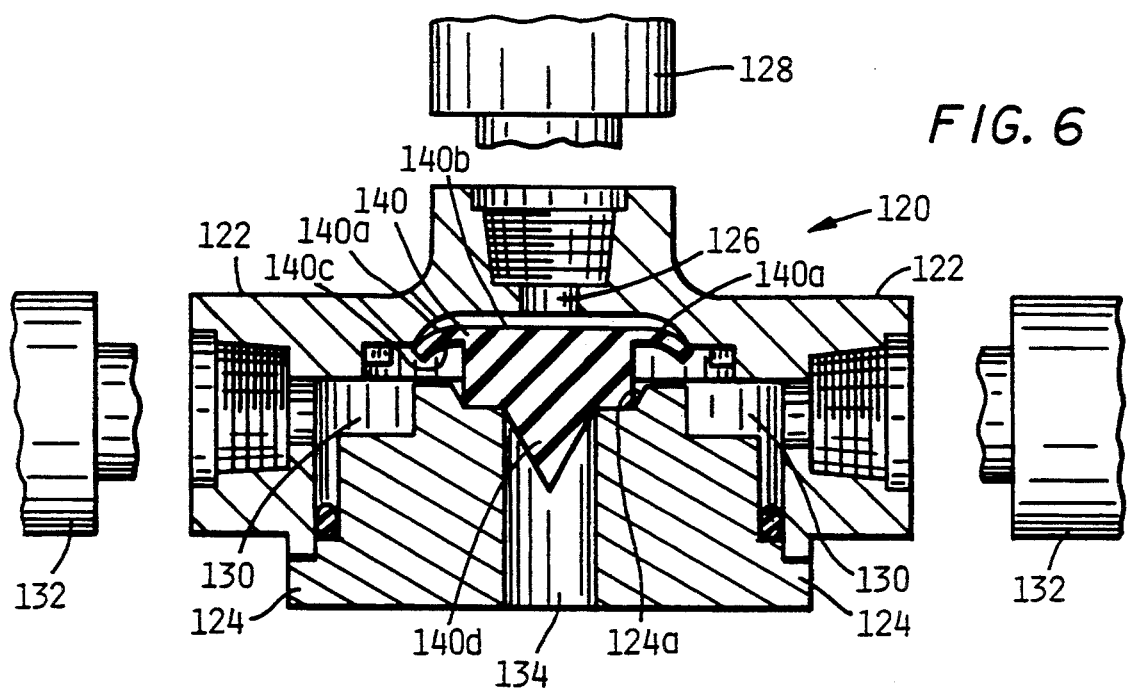
FIG. 6 is similar to FIG. 2 but illustrating a presently-preferred embodiment of the improved quick-release valve of the present invention, the function and operation being substantially the same as the embodiment of FIGS. 2–5.

A second and preferred embodiment 120 of the improved quick-release valve is shown in FIG. 6. This embodiment functions and operates as the previously-described embodiment but obviates the need for concentric ribs and is otherwise simplified and advantageous.

Valve 120 includes upper valve body 122, as viewed in FIG. 6, and lower, separate valve body 124. Portions of valve body 124 are disposed within upper valve body 122 so as to form a plurality of internal passageways. The valve bodies are affixed together by conventional means not shown herein.

These internal passageways include passageway 126 for fluid communication with an external pressurized air supply 128, internal passageway 130 for fluid communication with a plurality of spring-brake chambers 132 and internal passageway 134 for fluid communication with exhaust, that is, atmospheric pressure. Internal passageways 126, 130 and 134 would be in fluid communication with each other except for the presence of integrally-formed flexural connection diaphragm 140 which is circular in horizontal cross sections and is centrally disposed within valve 120 so as to isolate the internal passageways from each other except when flexed or otherwise moved so as to selectively connect internal passageway 126 with internal passageway 130 or internal passageway 130 with internal passageway 134. As with the embodiment of FIGS. 2-5, the diaphragm is flexible and resilient and typically is molded of rubber, e.g., about 70 durometer.

As with the previous embodiment employing concentric ribs, flexural connector diaphragm 140 has two areas subjected to the pressure in internal passageway 126, i.e., the partially-flexed, outer annular area 140a and the central area 140b. In contrast, only the lower annular area 140c is subject to the pressure in internal passageway 130. As previously described, the respective areas are designed so that a substantially constant high pressure can be maintained in internal area 130 despite fluctuations below such high pressure in internal passageway 126.

However, when the force produced by the pressure in internal passageway 130 acting on lower annular surface 140c is sufficient to overcome the force produced by the pressure in internal passageway 126 acting upon upper annular area 140a and central area 140b, diaphragm 140 is lifted, flexing the annular portions still further and unseating connection means 140 from the upper annular supporting surfaces of pocket 124a of valve body 124, whereby internal passageway 130 is connected to internal passageway 134 and thus exhaust. The exhaust action continues until the forces are again balanced or internal passageway 130 is completely exhausted.

Downward-depending cone 140d of diaphragm 140 in combination with the downwardly-inwardly slanted outer surfaces of pocket 124a provides a centering function. This assures that as diaphragm 140 is reseated on the horizontal annular surface of pocket 124a, it will properly center itself.

Figure 7:
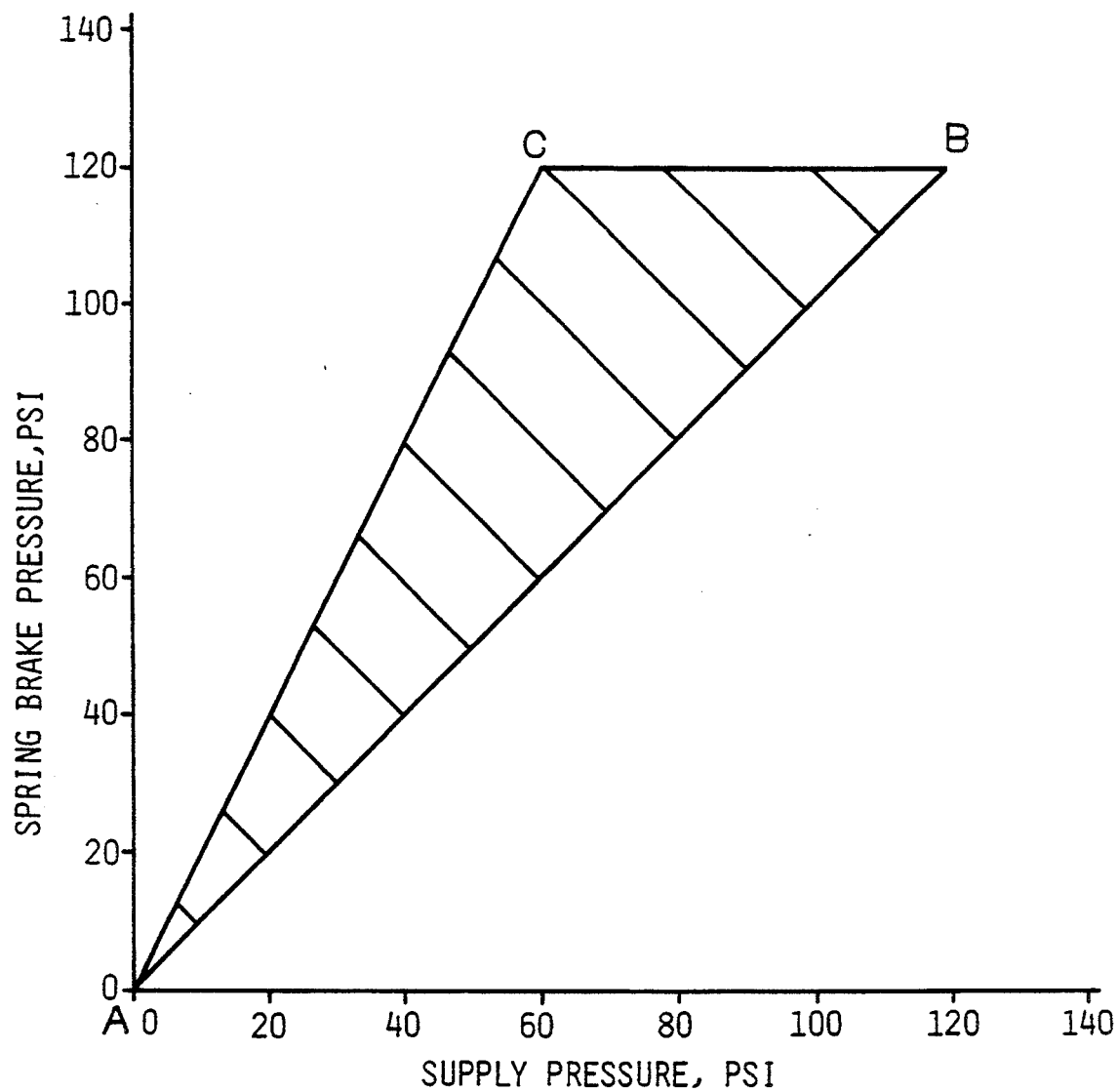
FIG. 7 graphically illustrates the idealized relationship between supply or inlet pressure and spring-brake chamber pressure both during the charge cycle and during the discharge or release cycle for typical operations of the embodiments of FIGS. 2–6.

FIG. 7 graphically illustrates, albeit idealistically, the relationship between the inlet or supply pressure and the spring-brake pressure for embodiments of both FIGS. 2-5 and FIG. 6. For this graphical representation, it is assumed that the supply or inlet pressure, and thus the spring-brake chamber pressure, is initially charged to about 120 psi, and that the ratio of the effective areas of the diaphragm is 2 to 1, that is the area on the inlet side is twice that on the spring-brake chamber side.

Accordingly, on the charge cycle the pressure builds in the inlet and in the spring-brake chambers builds from zero at point A to 120 psi at point B, as illustrated in the lower relationship of FIG. 7. Thereafter, any reduction in the supply or inlet pressure will not affect the spring-brake chamber pressure unless the supply pressure is reduced below about 60 psi, as determined by the aforesaid area ratio. Further reductions result in the spring-brake pressure being reduced at twice the rate of the inlet or supply pressure. This relationship is illustrated by the lines connecting points B, C and A. The spacing between lines A-B and A-C, represents the controlled hysteresis in the pressure response of the quick-release valve of the present invention.

It is to be understood that any allowed claims based on this application are to be accorded a range of equivalents commensurate in scope with the advance made over the prior art.

Having described the invention, what is claimed is:

1. A quick-release valve for the controlled exhaustion of pressurized fluid from a spring-set fluid-release brake chamber of a vehicle brake system, said brake chamber being operatively connectible to the vehicle's brake system and to the vehicle's source of pressurized fluid via said quick- release valve, said source of pressurized fluid being normally cyclable during vehicle operation between a first predetermined pressure and a lower second predetermined pressure, said quick release valve comprising:
   (a) a valve body;
   (b) a plurality of internal passageways within said valve body, including
      (i) an internal passageway for fluid communication with an external pressurized-fluid supply,
      (ii) an internal passageway for fluid communication with an external spring-brake chamber for releasing and setting a spring brake, the setting of the spring brake being initiated at a third predetermined pressure in said spring brake chamber substantially below said second predetermined pressure, and (iii) an internal passageway for fluid communication with exhaust, each of said internal passageways being selectively connectible to at least another of said internal passageways so as to establish continuous internal fluid communication therewith;

(c) an integrally-formed flexural spring-brake-release control diaphragm within said valve body having a substantially flat planer surface in the absence of pressure differentials across the diaphragm and substantially no initial prestress and disposed in relation to said internal passageways both to isolate same and responsive to the respective pressure conditions therein and areas of the diaphragm exposed to the respective pressure conditions, to selectively connect said internal passageways, whether (i) the internal passageway for fluid communication with a pressurized-fluid supply are connected to the internal passageway for fluid communication with an external spring-brake chamber only when the fluid pressure in the former exceeds that in the latter, and (ii) the internal passageway for fluid communication with an external spring-brake chamber are connected to the internal passageway for fluid communication with exhaust only when the pressure in the internal passageway for fluid communication with an external pressurized fluid supply is substantially below said second predetermined pressure whereby such connection to exhaust is avoided during normal cycling of the external pressurized fluid supply;

said spring-brake control diaphragm otherwise substantially isolating said internal passageways from each other.

2. The quick-release valve of claim 1 wherein said external pressurized fluid supply is a supply of compressed air.

3. The quick-release valve of claim 1 wherein said integrally-formed flexural spring-brake-release control diaphragm has differing areas exposed to the pressure conditions in the respective internal passageways.

4. The quick-release valve of claim 1 wherein said integrally-formed flexural spring-brake-release control diaphragm comprises a resilient diaphragm intermediate the respective internal passageways which flexes responsive to pressure conditions within said internal passageways.

5. A quick-release valve for the controlled exhaustion of pressurized air from the chambers of a spring-set air-release parking brake system, the latter embodying a source of compressed air and air brake chambers operatively connected to parking brakes, said valve comprising (a) a body member having an end face; (b) a collar depending from said end face; (c) a first valve seat means formed in said end face and spaced inwardly from said collar; (d) a first conduit formed in said end face and terminating at one end in an area delimited by said first valve seat means, said first conduit being adapted to communicate with a compressed air source; (e) a second conduit formed in said collar and being adapted to communicate with the spring-set air-release parking brake chambers; (f) a cap means mounted on said body member within an area defined by said collar and cooperating with said end face and said collar to form a cavity, said cap means having a central portion spaced from said end face and forming a wall of said cavity, a marginal portion encompassing said central portion and affixed to said collar; (g) a second valve seat means formed on said central portion and spaced inwardly of said first valve seat means; (h) exhaust port means formed in said central portion in an area thereof delimited by said second valve seat means; (i) an integrally-formed pressure-responsive valve member mounted within said cavity for movement between a first operative mode, an inoperative mode and a second operative mode; when in said inoperative mode, said valve member having a substantially flat planer surface, no initial prestress and segments thereof in simultaneous sealing engagement with said first and second valve seat means thereby blocking communication between said first and second conduits and said exhaust port means; when said valve member is in said first operative mode, communication between said first and second conduits is unblocked and communication between said second conduit and said exhaust port means is blocked; and when said valve member is in said second operative mode, communication between said first and second conduits is blocked and communication between said second conduit and said exhaust port means is unblocked; said valve member blocking communication between said first conduit and said exhaust port means regardless of what mode said valve member assumes; the second operative mode being operative only when the air pressure in said second conduit exceeds that in said first conduit by at least a predetermined pressure differential.

6. The quick-release valve of claim 5 wherein said first and second valve seat means include annular rib-like protuberances projecting respectively from said end face and said cap means central portion.

7. The quick-release valve of claim 6 wherein said first valve seat means encompasses in substantially concentric relation said second valve seat means.

8. The quick-release valve of claim 5 wherein said valve member is formed of a resilient, air impervious material.

9. The quick-release valve of claim 8 wherein said valve member has a disc-like configuration.

10. The quick-release valve of claim 5 wherein said valve member cooperates with the body member end face and said first valve seat means to form a first cavity section adapted to communicate with the source of compressed air; said valve member cooperates with said cap means central portion and said second valve seat means to form a second cavity section in communication with said exhaust port means; said valve member cooperates with said cap means marginal portion and said collar to form a third cavity section adapted to communicate with the brake chambers.

11. The quick-release valve of claim 10 wherein the first conduit is in continuous communication with the first cavity section and the second conduit is in continuous communication with the third cavity section.

12. The quick-release valve of claim 10 wherein the marginal portion of said cap member is offset relative to the central portion.

* * * * *